United States Patent
Ryu et al.

(10) Patent No.: US 6,201,599 B1
(45) Date of Patent: *Mar. 13, 2001

(54) OPTICAL TRANSMISSION LINE MONITORING APPARATUS

(75) Inventors: Shiro Ryu; Yukio Horiuchi, both of Tokyo (JP)

(73) Assignee: Kokusai Denshin Denwa Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,483

(22) Filed: Jul. 2, 1998

(30) Foreign Application Priority Data

Aug. 18, 1997 (JP) .................................................. 9-221270

(51) Int. Cl.$^7$ ................................................ G01N 21/00
(52) U.S. Cl. ................................................ 356/73.1
(58) Field of Search ................................ 356/73.1, 417; 385/24, 45; 250/227.15, 227.23

(56) References Cited

U.S. PATENT DOCUMENTS 5,673,342 * 9/1997 Nelson et al. ......................... 385/24

* cited by examiner

Primary Examiner—Frank G. Font
Assistant Examiner—Tu T. Nguyen
(74) Attorney, Agent, or Firm—Christie, Parker & Hale, LLP

(57) ABSTRACT

An apparatus for monitoring and measuring condition of a plurality of optical transmission lines individually according to this invention comprises at least one reflecting means having a predetermined reflection bandwidth arranged on each of said optical transmission lines; an optical pulse tester for outputting probe pulse light having predetermined wavelength in the reflection bandwidth of said reflecting means, and analyzing the reflected light of said probe pulse light in a time domain; optical coupling means for adding said probe pulse light from said optical pulse tester and a signal light, and coupling it to each of optical transmission lines through optical dividing means, along with coupling the reflected light of said probe pulse light to said optical pulse tester; and a plurality of optical filters arranged on the input end of each of said optical transmission lines for transmitting wavelength of signal light to be transmitted on their respective optical transmission lines and the predetermined wavelengths to be reflected on the reflection means on corresponding optical transmission lines. The predetermined wavelengths of a plurality of optical filters are different from each other.

3 Claims, 7 Drawing Sheets

OPTICAL TRANSMISSION LINE MONITORING APPARATUS

FIELD OF THE INVENTION

This invention relates to an optical transmission line monitoring apparatus, and more specifically, to an optical transmission line monitoring apparatus for detecting fault locations and so on in an optical network including branches.

BACKGROUND OF THE INVENTION

As means for monitoring and maintaining optical fiber lines of an optical fiber transmission system, there is an apparatus for measuring loss distribution of the optical fiber lines for their longitudinal distance by inputting a short optical pulse(a probe pulse light) to the optical fiber lines, and observing optical intensity of its Rayleigh backscattered light in a time domain. Accordingly, increase of loss and break at local points on the optical fiber lines can be detected.

It is often seen in an urban type optical network or an access optical network that an optical transmission system demultiplexes a signal light of a wavelength $\lambda s$ from a single optical transmitting apparatus into numbers of portions by an optical multiplexing/demultiplexing apparatus, and transmits them to numbers of optical receiving apparatuses through respective optical transmission lines. In such cases to transmit different signals to the respective optical receiving apparatuses, a time-division multiplexing system is used.

An optical switch may be arranged to make the individual optical fiber transmission lines possible to connect a pulse tester selectively for detecting increase of loss and break on each of optical fiber lines in a branch type optical transmission system. This method, however, does not permit to measure the optical fiber lines when needed, nor continuously monitor the individual optical fiber lines.

As a solution of the above-mentioned problems, the same applicant, for example, has proposed an apparatus for detecting a fault location shown in FIG. 7. Details of the proposal are explained on the Heisei 8 nen patent application No. 205677 referring to FIG. 7.

An optical transmitting apparatus 10 outputs an optical signal of a wavelength $\lambda s$ for a number of optical receiving apparatuses 12-1~12-n. The signal for the respective optical receiving apparatuses 12-1~12-n is time-division-multiplexed on optical signals of the same wavelength $\lambda s$ except for cases to transmit the same informational contents to the respective optical receiving apparatuses 12-1~12-n. An optical pulse tester 14 is an apparatus to generate probe pulse lights of wavelengths $\lambda 1$~$\lambda n$ different from the wavelength $\lambda s$ of the signal light, and measure their reflected lights in a time domain. The optical pulse tester 14 generally uses a tunable wavelength light source to generate a probe pulse light having a desired wavelength within wavelengths $\lambda 1$~$\lambda n$.

An optical combiner/divider 16 is arranged to add an output light of the optical transmitting apparatus 10 and an output light (a probe light) of the optical pulse tester 14, transmit them to a port M(multiplexed light) of an optical combiner/divider 18, and return a reflected light from the port M of the optical combiner/divider 18 to the optical pulse tester 14.

The optical combiner/divider 18 divides the light introduced into the port M into n portions, and outputs them from divided light ports #1~#n to optical fiber lines 20-1~20-n respectively. The above-mentioned optical receiving apparatuses 12-1~12-n are connected to the end terminals of the respective optical fiber lines 20-1~20-n. Reflecting elements 22-1~22-n, which comprise, for example, optical fiber gratings, and have a reflectivity of about 0.1~10% for reflecting the wavelengths $\lambda 1$~$\lambda n$, are arranged at marked points such as connecting points of the optical fibers on the individual optical fiber lines When monitoring or measuring condition of the optical fiber line 20-1 is desired in such an arrangement, a probe pulse light of the wavelength $\lambda 1$ is obtained from the optical pulse tester 14. The probe pulse light enters the optical combiner/divider 18 through the optical combiner/divider 16. The optical combiner/divider 18 distributes the incident light of the port M to all the optical fiber lines 20-1~20-n. The probe pulse light of the wavelength $\lambda 1$ is transmitted on the optical fiber line 20-1, being reflected by the reflecting element 22-1 at the optical fiber line 20-1, and is transmitted on the optical fiber lines 20-2~20-n without being reflected by the reflecting elements 22-2~22-n at the other optical fiber lines 20-2~20-n.

Both of the reflected lights, reflected by the reflecting element 22-1 of the optical fiber line 20-1, and Rayleigh backscattered lights from the optical fiber line 20-1, are introduced into a divided light port #1 of the optical combiner/divider 18, and Rayleigh backscattered lights from the optical fiber lines 20-2~20-n are introduced into the divided light ports #2~#n. The optical combiner/divider 18 adds the reflected lights and the Rayleigh backscattered lights, and the combined lights are obtained from the port M to the optical combiner/divider 16. The output from the port M is divided by the combiner/divider 16, being introduced into the optical pulse tester 14. That is, the Rayleigh back-scattered lights of the optical fiber lines 20-1~20-n and the reflected lights of the reflection element 22-1 of the optical fiber line 20-1 are introduced into the optical pulse tester 14.

The optical pulse tester 14 analyzes the intensity of the reflected lights from the optical fiber lines 20-1~20-n in a time domain(including to display on a monitor and/or printout). Reflected pulses from the reflecting elements 22-1~22-n become position standards, namely, position markers.

In the arrangement shown in FIG. 7, it is difficult to measure slight faults of the respective optical fiber lines 20-1~20-n precisely using the Rayleigh backward scattering, since the reflected lights of the respective optical fiber lines 20-1~20-n return to the optical pulse tester 14 being overlapped. However, when a break or a crack occurs, a Fresnel reflected pulse is generated from the fault location, and the reflected lights from the reflecting elements 22-1~22-n located backward from the break or crack vanish or become weaker than usual. Accordingly, the optical fiber line having the break and so on can be identified from the optical fiber lines 20-1~20-n by the wavelengths $\lambda 1$~$\lambda n$ of the probe lights, and, moreover, a location of the break and so on can be measured based on the locations(known beforehand) of the reflecting elements 22-1~22-n with higher measurement precision. For example, the probe light of the wavelength $\lambda 1$ can detect presence and location of a break of the optical fiber line 20-1 based on the location of the reflecting element 22-1 more precisely than conventional arts, and, similarly, the probe light of the wavelength $\lambda n$ can detect presence and location of a break in the optical fiber line 20-n based on the location of the reflecting element 22-n more precisely than conventional arts.

In the arrangement shown in FIG. 7, however, it is difficult to measure the loss characteristic of the respective optical fiber lines 20-1~20-n precisely. For example, when the optical pulse tester 14 generates the probe pulse light of the wavelength λ1, all the backscattered lights from the optical fiber lines 20-1~20-n are introduced into the optical pulse tester 14. Consequently, it becomes difficult to take a loss characteristic of the optical fiber line 20-1 alone, and yet measure it precisely.

Moreover, as the reflecting elements 22-1~22-n having the same reflection wavelengths λ1~λn are provided on the same optical fiber lines 20-1~20-n, it is difficult to detect a break occurred between the reflecting elements when distance between the adjacent reflecting elements being smaller than the distance resolution of the optical pulse tester 14.

SUMMARY OF THE INVENTION

An object of the invention is to provide an optical transmission line monitoring apparatus that can monitor condition of respective optical transmission lines even if it is an optical transmission system being branched into a plurality of optical transmission lines, for solving all the above-mentioned problems.

Another object of the invention is to provide an optical transmission line monitoring apparatus that can monitor a condition of plural optical transmission lines continuously, especially in an in-service condition.

A further object of the invention is to provide an optical transmission line monitoring apparatus that can detect conditions of plural optical transmission lines simultaneously.

An even further object of the invention is to provide an optical transmission line monitoring apparatus that can detect a fault location with higher precision.

The invention relates to an optical transmission line monitoring apparatus for monitoring and measuring conditions of respective transmission lines by arranging at least one reflecting means having a predetermined reflection bandwidth to each of a plurality of optical transmission lines, and analyzing in a time domain a reflected light obtained by applying a probe pulse light, having at least one predetermined wavelength included within the wavelengths of the reflection bandwidth of said reflecting means, to said optical transmission lines in an optical transmission system that divides a signal light from an optical transmitting apparatus into numbers of portions by optical dividing means, and transmits them to a plurality of optical receiving apparatuses through a plurality of optical transmission lines. The optical transmission line monitoring apparatus, moreover, is characterized that the optical filters are provided on each of divided light outputs of the optical dividing means, each optical filter being transmitting a signal light propagating on the connected optical transmission line and transmitting a predetermined transmission wavelength, which is included within the reflection bandwidth of the reflecting means arranged on said optical transmission line, their predetermined transmission wavelength being different from each other.

According to the invention, a probe pulse light of a certain wavelength can be introduced into only one specific optical transmission line. As a result, a transmission characteristic of any one of the optical transmission lines can be monitored or measured distinctively from the other optical transmission lines.

An in-service monitoring can be realized by making a wavelength of a signal light different from any wavelengths of the probe light for monitoring the condition of the respective optical transmission lines.

In an optical transmission system, which assigns different signal wavelengths to each of a plurality of optical transmission lines, demultiplexes a signal light output of an optical transmitting apparatus to each of signal wavelengths using a wavelength-dependent optical demultiplexer, and transmits the signal lights of respective signal wavelength to respective optical receiving apparatus through the corresponding optical transmission lines, the invention relates to an optical transmission line monitoring apparatus for monitoring and measuring each of said plural optical transmission lines by providing at least one reflecting means, having predetermined reflection bandwidth, to each of said plurality of optical transmission lines, and analyzing in a time domain reflected lights obtained by applying a probe pulse light, having at least one predetermined wavelength, to each of the optical transmission lines. Characteristically, the reflection bandwidth of said reflecting means to be located on the same optical transmission line includes the signal wavelength assigned to said optical transmission line.

By using the invention, monitoring and measuring condition of respective optical transmission lines can be realized although an in-service monitoring becomes difficult or impossible.

The wavelength dependent optical demultiplexer may comprise an optical divider, which does not have wavelength dependence, and a plurality of optical filter means connected to the divided light output of the optical divider for passing through only predetermined wavelengths, or may comprise an arrayed waveguide grating type demultiplexer. In the latter, the structure becomes simpler although selection of wavelengths is limited.

A probe pulse light of single wavelength can monitor condition of respective optical transmission lines by adjusting substantial reflection wavelengths of reflecting means on the same optical transmission line the same and those on different optical transmission lines different.

In an optical transmission system which assigns a different signal wavelength to each of plurality of optical transmission lines, demultiplexes a wavelength-division-multiplexed light output from an optical transmitting apparatus into each of signal wavelengths by a wavelength dependent optical demultiplexing means, having wavelength periodicity, the invention further relates to an optical transmission line monitoring apparatus which monitors and measures each of said plurality of optical transmission lines by providing at least one reflecting means, having a predetermined reflection bandwidth, to each of said plurality of optical transmission lines, and analyzing in a time domain a reflected light, obtained by applying a probe pulse light of one or more predetermined wavelengths to each optical transmission line. Characteristically, the reflection bandwidth of said reflecting means to be located on the same optical transmission line does not include the signal wavelength assigned to said optical transmission line, and includes at least one wavelength which can be output from a demultiplexed light port of said wavelength dependent optical demultiplexing means, to which said optical transmission line is connected.

Thus, it makes possible to use a probe pulse light having a wavelength different from the signal wavelength, and, therefore, an in-service monitoring becomes possible.

By arranging at least one portion of reflection bandwidths of the adjacent reflecting means does not overlap each other, a fault occurred at a location near to any of reflecting means can be detected correctly using a probe pulse light, having a wavelength being out of the reflection bandwidth of the reflecting means, and also the fault location can be detected more precisely due to position markers by reflected pulses from the other reflecting means.

A simple structure can be realized when said wavelength dependent optical demultiplexing means comprises an arrayed waveguide grating type demultiplexer.

In an optical transmission system which assigns a different signal wavelength to each of plurality of optical transmission lines, demultiplexes a signal light output of an optical transmitting apparatus to each of signal wavelengths using wavelength dependent optical demultiplexing means, and transmits the signal light having each of signal wavelengths to respective optical receiving apparatuses through the corresponding optical transmission lines, the invention further relates to an optical transmission line monitoring apparatus which monitors and measures each of said plurality of optical transmission lines by providing at least one reflecting means, having a predetermined reflection bandwidth, to each of said optical transmission lines, and analyzing in a time domain a reflected light obtained by applying a probe pulse light having at least one predetermined wavelength, to each of optical transmission lines. Characteristically, the reflection bandwidths of said reflecting means to be located on the same optical transmission line include any of wavelengths, which are further subdivided from the signal wavelength bandwidth assigned to said optical transmission line.

According to this invention, it becomes possible to monitor and measure a characteristic of each of optical transmission lines distinctively from the other optical transmission lines, although an in-service monitoring becomes impossible.

The wavelength dependent optical demultiplexer may comprise an optical divider, which does not have wavelength dependence, and a plurality of optical filter means connected to the divided light output of the optical divider for passing through only predetermined wavelengths, or may comprise an arrayed waveguide grating type demultiplexer. In the latter, the structure becomes simpler although selection of wavelengths is limited.

By arranging at least one portion of reflection bandwidths of the adjacent reflecting means does not overlap each other, a fault occurred at a location near to any of the reflecting means can be detected correctly using a probe pulse light having a wavelength, which is not included in the reflection bandwidth of the reflecting means, and also the fault location can be detected more precisely due to position markers by reflected pulses from the other reflecting means.

DESCRIPTION OF THE PREFERRED EMBODIMENTS

Preferred embodiments of the invention will be described below in details by referring to the accompanying drawings.

Figure 1:
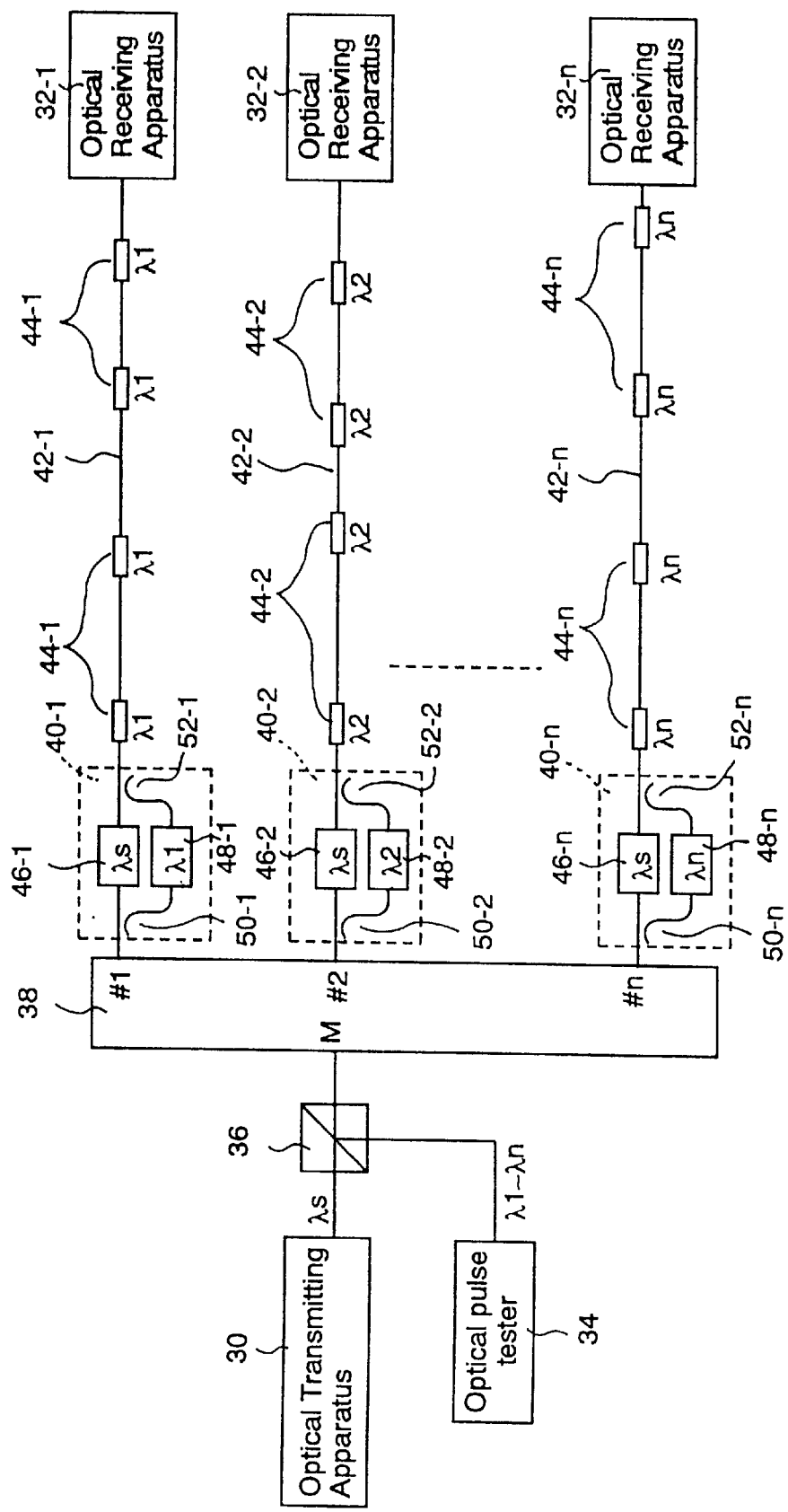
FIG. 1 is a schematic block diagram showing a first embodiment of the invention.
Figure 7:
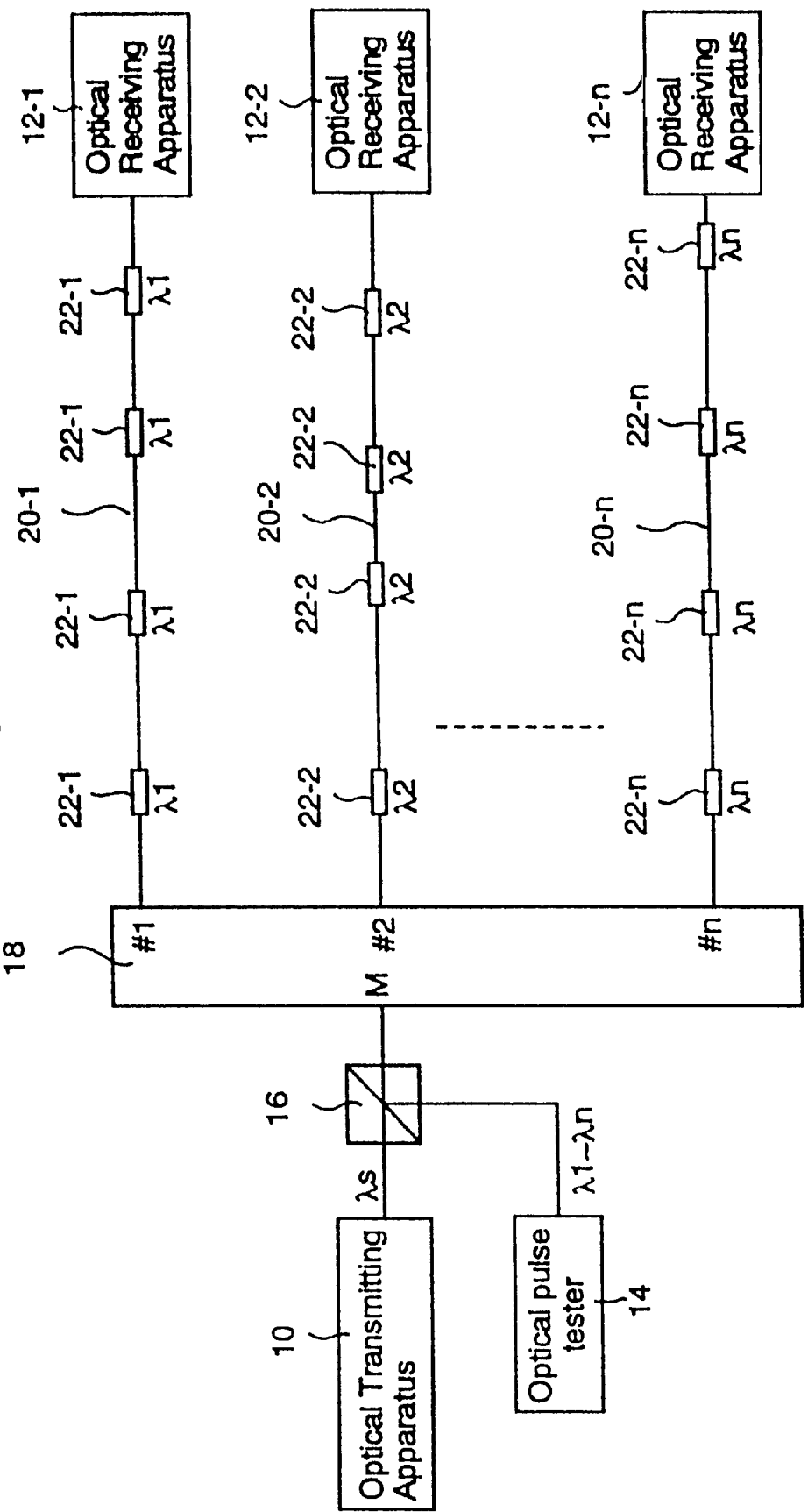
FIG. 7 is a schematic block diagram of prior art.

FIG. 1 shows a schematic block diagram of a first embodiment of the invention. An optical transmitting apparatus 30, similar to an optical transmitting apparatus 10 in FIG. 7, outputs optical signals of the wavelength $\lambda s$ for a number of optical receiving apparatuses 32-1~32-n. An optical pulse tester 34, similar to an optical pulse tester 14, generates probe pulse lights of wavelengths $\lambda 1 \sim \lambda n$, which are different from the wavelength $\lambda s$ of the signal light, and measures their reflected lights on the time domain. That is, the optical transmitting apparatus 30 outputs the optical signals of the wavelength $\lambda s$ which are obtained after time-division-multiplexing the signals for individual optical receiving apparatuses 32-1~32-n, and the optical pulse tester 34 generates probe pulse lights of a desired wavelength within $\lambda 1 \sim \lambda n$ using, generally, a tunable wavelength optical source.

Functions of an optical combiner/divider 36 and an optical combiner/divider 38 are also equivalent to the optical combiner/divider 16 and optical combiner/divider 18 respectively. Namely, the optical combiner/divider 36 is arranged to add output lights of the wavelength $\lambda s$ from the optical transmitting apparatus 30 and output lights(probe lights) from the optical pulse tester 34, provide them to a port M of the optical combiner/divider 38, and returned lights(reflected lights from optical fiber lines 42-1~42-n as to be described below) to the optical pulse tester 34. The optical combiner/divider 38 divides an input light of the port M into n portions to output them from divided light ports #1~#n and, also, combines input lights of the divided light ports #1~#n to output from the port M. Each of the divided light ports #1~#n of the optical combiner/divider 38 is connected to the optical receiving apparatuses 32-1~32-n through optical filters 40-1~40-n, which transmit only the wavelength $\lambda s$ of the signal light and a predetermined wavelength within the wavelength $\lambda 1 \sim \lambda n$, and the optical fiber lines 42-1~42-n.

Each optical fiber line 42-i (i=1~n; the following i's are the same.), similar to the optical fiber 20-i, comprises reflecting elements 44-i, each of which has a reflectivity of 0.1~10% for reflecting the wavelength $\lambda i$, at marked locations such as connecting positions of optical fibers. An optical filter 40-i, for example, as shown in FIG. 1, has an optical circuit structure wherein an optical filter 46-i for transmitting the wavelength $\lambda s$ of the signal light, is connected in parallel to an optical filter 48-i for transmitting only the wavelength $\lambda i$ of a probe light, which is assigned to the corresponding optical fiber line 42-i for monitoring the line, using optical couplers 50-i and 52-i. Accordingly, in the embodiment of the invention, the light of the wavelength $\lambda s$ (in this case, the signal light) and the wavelength $\lambda i$ (in this case, the probe light) are all that can be introduced into the optical fiber line 42-i, and reflected lights of the wavelength $\lambda s$ and $\lambda i$ are all that can be introduced into the divided light port #1 of the optical combiner/divider 38.

Preferably, the optical filter 48-i and reflecting element 44-i should be designed and produced as the transmission center wavelength of the optical filter 48-i becomes equal to the reflection center wavelength of the reflecting element 44-i.

The following gives a description about the operation of the embodiment. The signal light(of the wavelength $\lambda s$), from the optical transmitting apparatus 30, is introduced into the optical combiner/divider 38 through the optical combiner/divider 36, divided into n portions there, and output from the divided light ports #1~#n of the optical combiner/divider 38. The signal light of the wavelength $\lambda s$, from the divided light ports #1~#n of the optical combiner/ divider 38, is introduced into each of optical fiber lines 42-1~42-n through the optical filters 46-1~46-n of the optical filters 40-1~40-n, and finally reach respective optical receiving apparatuses 32-1~32-n, without being reflected even by the reflecting elements 44-1~44-n.

When monitoring or measuring condition of the optical fibers 42-1~42-n, the optical pulse tester 34 is set to output a probe pulse light of any corresponding wavelengths $\lambda 1 \sim \lambda n$. For instance, supposing to monitor or measure the condition of the optical fiber line 42-1, the optical pulse tester 34 is set to output the probe pulse light of the wavelength $\lambda 1$. The output probe pulse light is introduced into the optical combiner/divider 38 through the optical combiner/divider 36. The optical combiner/divider 38 divides the incident light of the port M into n portions, and prepares to output to the optical filters 40-1~40-n through the divided light ports #1~#n.

At an output of the divided light port #1 of the optical combiner/divider 38, the probe pulse light of the wavelength $\lambda 1$ is introduced into the optical fiber line 42-1 since it can pass through the optical filter 48-1 of the optical filter 40-1, and, being reflected by the reflecting element 44-1, is transmitted beyond the reflecting element 44-1 on the optical fiber line 42-1. The probe light of the wavelength $\lambda 1$ transmitting on the optical fiber line 42-1 is Rayleigh backscattered as being reflected by the reflecting element 44-1, and, if a break and so on exists, Fresnel-reflected at the very point. These reflected lights are transmitted on the opposite direction on the optical fiber line 42-1, and input to the divided light port #1 of the optical combiner/divider 38 through the optical filter 40-1. While, at the outputs of the other divided light ports #2~#n of the optical combiner/divider 38, the probe light of the wavelength $\lambda 1$ cannot enter the optical fiber lines 42-2~42-n, since it cannot pass through the optical filters 40-2~40-n. Consequently, a reflected light of the probe light of the wavelength $\lambda 1$ does not enter the divided light ports #2~#n from the optical fiber lines 42-1~42-n.

The optical combiner/divider 38 combines lights being introduced into each of the divided light ports #1~#n from the optical fiber lines 42-1~42-n through the optical filters 40-1~40-n respectively, and outputs the combined light to the optical combiner/divider 36 from the port M. When the optical pulse tester 34 outputs the probe light of the wavelength $\lambda 1$, lights from the optical fiber lines 42-1~42-n are mainly the reflected lights of the probe light of the wavelength $\lambda 1$ from the optical fiber line 42-1. The optical combiner/divider 38 outputs the reflected lights, introduced into the port #1 from the optical fiber line 42-1, to the optical combiner/divider 36 from the port M. The lights are introduced into the optical pulse tester 34 being reflected by the optical combiner/divide 36.

As mentioned above, in the embodiment, about the probe pulse light of the wavelength $\lambda 1$, the Rayleigh scattering lights and the reflected lights generated on the optical fiber line 42-1 alone are introduced into the optical pulse tester 34. Hence, the characteristics of the optical fiber line 42-1 can be measured distinctively from those of the other optical fiber lines 42-2~42-n. The optical pulse tester 34 analyzes the intensity of the reflected lights from the optical fiber line 42-1 in a time domain (including to display on a monitor and/or printout).

If monitoring the optical fiber line 42-2 is desired, a probe pulse light of the wavelength $\lambda 2$ should be generated. By this operation, the condition of the optical fiber line 42-2 can be measured distinctively from those of the other optical fiber lines 42-1, 42-3~42-n.

In the embodiment, since the wavelength $\lambda s$ of the signal light and the wavelength $\lambda 1 \sim \lambda n$ of the probe light are different, the condition of the optical fiber lines 42-1~42-n can be monitored or measured during the transmission of the signal light(namely, in an in-service condition). Fault locations of breaks and cracks etc. can be determined precisely because it is possible to measure the fault locations with high precision based on reflected pulses from the reflecting elements 44-1~44-n, their locations being known beforehand.

In the embodiment shown in FIG. 1, the optical pulse tester 34 was described to output a probe pulse light of any single wavelength. However, it is obvious that a plurality of probe pulse lights having different wavelengths can be generated simultaneously if the optical pulse tester 34 can demultiplex returned lights into each wavelength, and yet individually analyze them.

Figure 2:
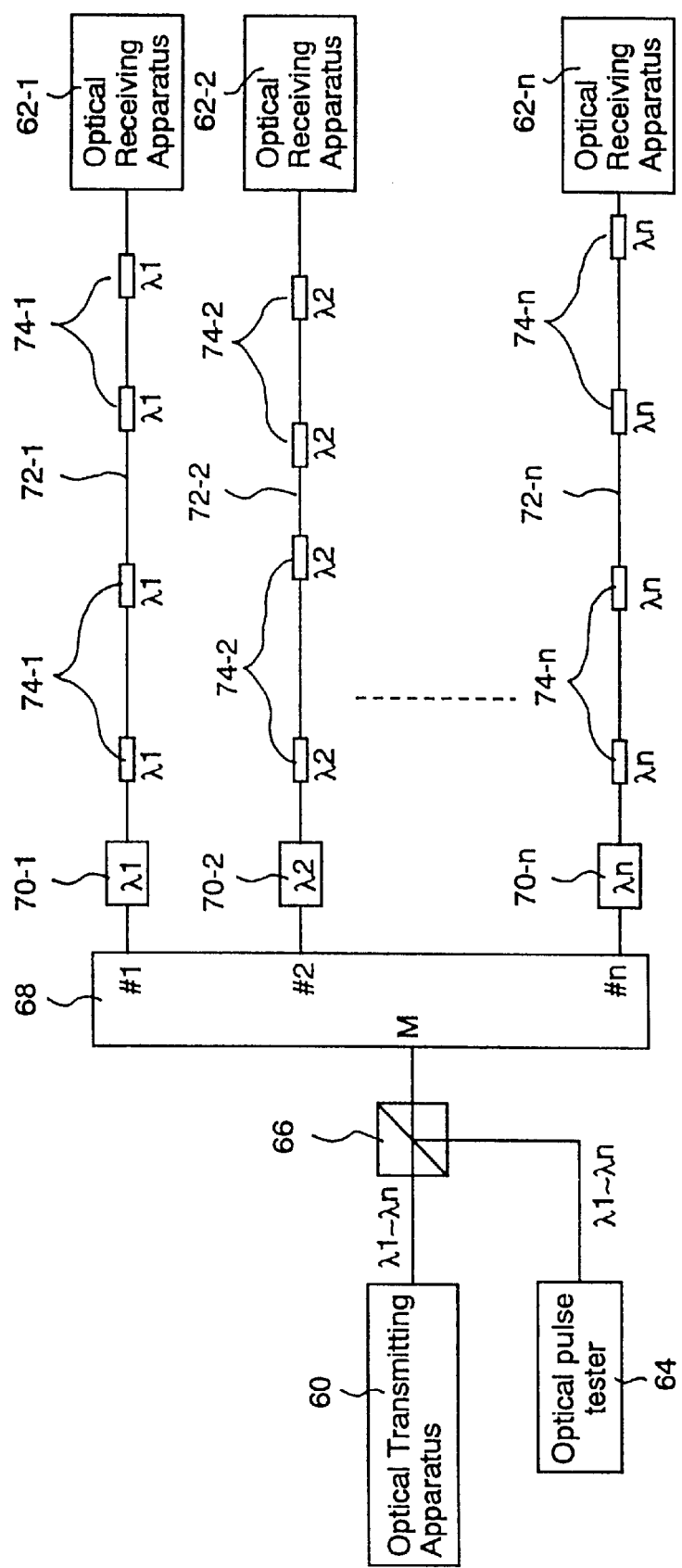
FIG. 2 is a schematic block diagram showing a second embodiment of the invention.

FIG. 2 shows a schematic block diagram of a second embodiment of the invention. In the embodiment, an optical transmitting apparatus transmits a signal light to a plurality of optical receiving apparatuses using a wavelength-division multiplexing system. A wavelength of a probe light is the same as a wavelength of a signal light. That is, the optical transmitting apparatus 60 outputs signal lights, obtained by wavelength-division-multiplexing respective signal lights of the wavelengths $\lambda 1 \sim \lambda n$, and the optical receiving apparatuses 62-1~62-n, on the other hand, receive the signal lights of the wavelength $\lambda 1 \sim \lambda n$ respectively.

An optical pulse tester 64, similar to the optical pulse tester 34, generates a probe light of any wavelength within the wavelength $\lambda 1 \sim \lambda n$ and analyzes its returning reflected light in a time domain. The structures and functions of an optical combiner/divider 66 and optical combiner/divider 68 are exactly the same with those of the optical combiner/divider 36 and optical combiner/divider 38. Divided light ports #1~#n of the optical combiner/divider 68 are connected to the optical receiving apparatuses 62-1~62-n through optical filters 70-1~70-n, which transmit only one corresponding wavelength within the wavelengths $\lambda 1 \sim \lambda n$, and optical fiber lines 72-1~72-n.

Respective optical fiber line 72-i (i=1~n), similar to the optical fiber 20-i, comprises reflecting elements 74-i, each of which has a reflectivity of 0.1~10% for reflecting the wavelength $\lambda i$, located at marked locations such as connecting positions of the optical fiber. The optical filter 70-i comprises an optical filter, which passes through the wavelength $\lambda i$ alone, assigned to the corresponding optical fiber 42-i (or the optical receiving apparatus 62-i). Accordingly, in the embodiment, the only assigned single wavelength $\lambda i$ can be transmitted on the optical fiber line 42-i.

Needless to say, the optical filter 70-i and reflecting element 74-i are designed and produced preferably so as the transmission center wavelength of the optical filter 70-i becomes equal to the reflection center wavelength of the reflecting element 74-i.

Explained below is an operation of the embodiment shown in FIG. 2. The optical transmitting apparatus 60 outputs the signal lights, obtained after wavelength-division-multiplexing a signal light of the wavelength $\lambda 1$ directed to the optical receiving apparatus 62-1, the signal light of the wavelength $\lambda 2$ directed to the optical receiving apparatus 62-2, . . . , and the signal light of the wavelength $\lambda n$ directed to the optical receiving apparatus 62-n. The wavelength-division-multiplexed signal lights from the optical transmitting apparatus 60 are introduced into the optical combiner/divider 68 through the optical combiner/divider 66, and output from the divided light ports #1~#n after being divided into n portions. Since the optical filter 70-i, which transmits the only corresponding wavelength λi, is arranged at each divided light port #i (i=1~n), substantially, the signal light of the corresponding wavelength λi alone can be input and be transmitted through each optical fiber line 72-i. For example, a signal light, which can input to the optical fiber line 72-2 and transmit on it, is the only signal light of the wavelength λ2. After all, the wavelength-division-multiplexed optical signal from the optical transmitting apparatus 60, is wavelength-demultiplexed into each of the wavelengths λ1~λn by the optical combiner/divider 68 and the optical filters 70-1~70-n, each signal of wavelength λ1~λn being propagating on the corresponding optical fiber lines 72-1~72-n until reaching the optical receiving apparatuses 62-1~62-n to be processed.

When monitoring or measuring the condition of the optical fiber lines 72-1~72-n, the optical pulse tester 64 is set to output a probe pulse light of any corresponding wavelengths λ1~λn. For instance, in order to monitor or measure the condition of the optical fiber line 72-1, the optical pulse tester 64 is set to output a probe pulse light of the wavelength λ1. The probe pulse light is introduced into a port M of the optical combiner/divider 68 through the optical combiner/divider 66. The optical adder/divide 68 divides the incident light of the port M into n portions, and assigns to each of the division light ports #1~#n. However, since the optical filter 70-1 alone can transmit the wavelength λ1, the probe pulse light of the wavelength λ1 is introduced into the only optical fiber line 72-1, and is transmitted on the line ahead being reflected by the reflecting element 74-1. While, on the other optical fiber lines 72-2~72-n, the probe light of the wavelength λ1 is not able to enter the optical fiber lines 72-2~72-n since it cannot pass through the optical filters 70-2~70-n.

The optical combiner/divider 68 combines the lights introduced into each of the divided light ports #1~#n from the optical fiber lines 72-1~72-n through the optical filters 70-1~70-n, and outputs the result to the optical combiner/divider 66 from the port M. When the optical pulse tester 64 outputs the probe light of the wavelength λ1, lights from the optical fiber lines 72-1~72-n consist mainly reflected lights of the probe light of the wavelength λ1 from the optical fiber line 72-1. The optical combiner/divider 68 outputs the reflected lights, introduced into the divided light port #1 from the optical fiber line 72-1, to the optical combiner/divider 66 from the port M. The lights enter the optical pulse tester 64 after being reflected by the optical combiner/divider 66.

As shown above, in the embodiment, when a probe pulse light of the wavelength λ1 is output from the optical pulse tester 64, Rayleigh backscattered lights and reflected lights, generated on the optical fiber line 72-1, alone enter the optical pulse tester 64. As a result, characteristics of the optical fiber line 72-1 can be measured distinctively from those of the other optical fiber lines 72-2~72-n. The optical pulse tester 64 analyzes the intensity of the reflected lights from the optical fiber line 72-1 in a time domain(including to display on a monitor and/or printout).

When monitoring the optical fiber line 72-2, the optical pulse tester 64 may be set to generate a probe pulse light of the wavelength λ2. By this operation, a condition of the optical fiber line 72-2 can be measured distinctively from those of the other optical fiber lines 72-1, 72-3~72-n.

As the wavelength of the probe light, which monitors the condition of each of the optical fiber lines 72-1~72-n, is adjusted the same as the wavelength of the signal light in the embodiment, the condition of each of the optical fiber lines 72-1~72-n can be monitored or measured individually(that is, separating from the other optical fiber lines 72-1~72-n), although monitoring or measurement in an in-service condition is impossible. Fault locations of breaks and cracks can be determined precisely because the fault locations are measured with high accuracy based on the reflected pulses from the reflecting elements 74-1~74-n, their locations being known beforehand.

In the embodiment shown in FIG. 2, the optical pulse tester 64 was described to output a probe pulse light of any single wavelength. However, it is obvious that probe pulse lights of a plurality of wavelengths can be output simultaneously, if the optical pulse tester 64 can divide the return lights into each of wavelengths, and analyze them individually.

In the embodiment shown in FIG. 2, the wavelength demultiplexing elements can be obtained by connecting the optical filters 70-1~70-n, which transmit the only one of the wavelengths λ1~λn, to the respective divided light ports #1~#n of the optical combiner/divider 68. It is evident to get the same effect when the portion, consisted of the optical combiner/divider 68 and the optical filters 70-1~70-n, is replaced with an optical combiner/divider with wavelength dependence, having a similar wavelength multiplexing/demultiplexing function. As such a wavelength dependent optical combiner/divider, an arrayed waveguide grating (AWG) is widely known. If the arrayed waveguide grating is used as an optical adder/divider of wavelength dependence, although wavelength intervals of λ1~λn are limited, the loss accompanied with wavelength demultiplexing becomes smaller, since it does not simply divide an input light of the port M into n portions.

Figure 3:
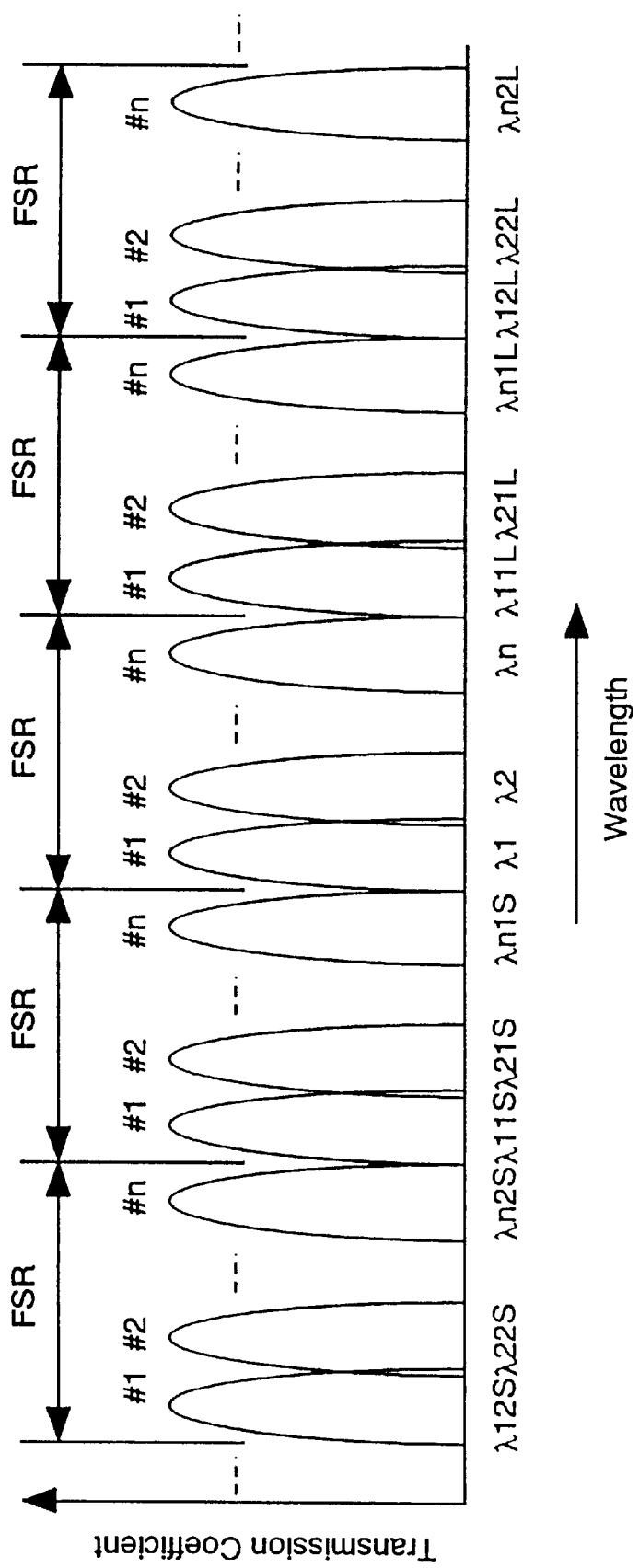
FIG. 3 shows the transmission characteristics of an AWG.

Divided light ports #1~#n of the arrayed waveguide grating comprise wavelength characteristics of transmission coefficient having periodicity as shown in FIG. 3. Namely, the transmission coefficient versus wavelength characteristics of the wavelengths λ1~λn, which are designed originally with the intention of using, are repeated over and over at the longer and shorter wavelengths. The cycle of the repeating, of this case, is called as FSR(Free Spectral Range). For example, lights output from the division light port #1 of the AWG are the lights of the wavelengths λ11L, λ12L, ..., and the wavelengths λ11S, λ12S, ..., in addition to the wavelength λ1. This can be applied to use a probe light having a wavelength band, which is different from the wavelength band of the signal light.

Figure 4:
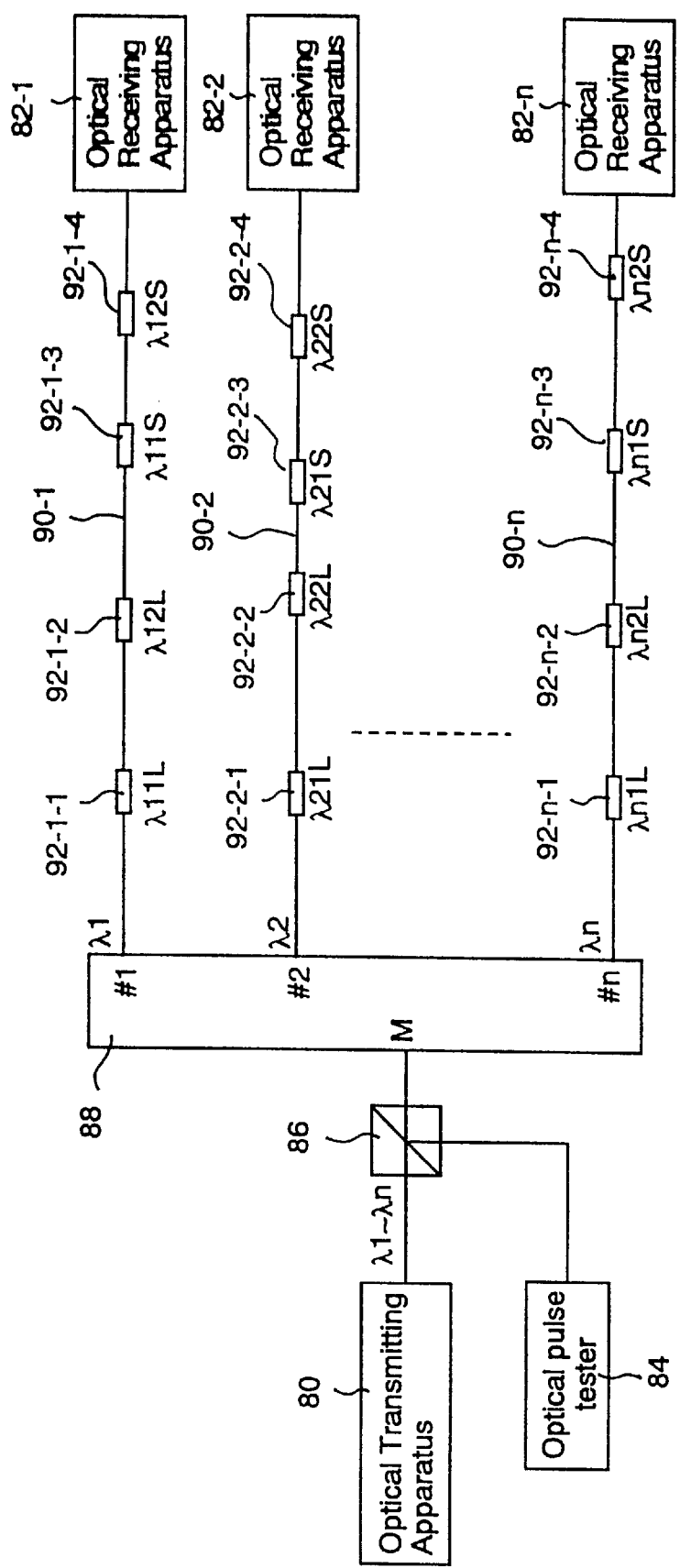
FIG. 4 is a schematic block diagram showing a third embodiment of the invention.

FIG. 4 is a schematic block diagram of a third embodiment, which can measure a fault location with higher precision in an in-service condition. In this embodiment, a signal light is also transmitted by a wavelength-division multiplexing system. An optical transmitting apparatus 80 outputs a signal light obtained by wavelength-division-multiplexing individual different signal lights of wavelengths λ1~λn directed to respective optical receiving apparatuses 82-1~82-n. Each of the optical receiving apparatuses 82-1~82-n receives and processes the corresponding signal lights of the wavelengths λ1~λn.

An optical pulse tester 84, although the further details are to be mentioned later, generates a probe light of a wavelength which belongs to a FSR different from the FSR to which the wavelengths λ1~λn of the signal light belong, and analyzes its reflected light in a time domain. An optical combiner/divider 86 is arranged to add an output light of the optical transmitting apparatus 80 and the output light(the probe light) of the optical pulse tester 84, to provide them to a port M(multiplexed light) of an arrayed waveguide grating (AWG) 88, and to return lights(reflected lights, which will be described later, from optical fiber lines 90-1~90-n) from the port M of the AWG 88, back to the optical pulse tester 84. The AWG 88 being as a wavelength multiplexing/demultiplexing element or a wavelength dependent optical divider, as it is commonly known, wavelength-demultiplexes input lights of the port M at predetermined wavelength intervals shown in FIG. 3, and outputs lights of respective wavelength components from corresponding individual wavelength ports(divided light ports) #1~#n, along with multiplexing the light of respective wavelength components entered the respective corresponding individual wavelength ports(divided light ports) #1~#n and outputting the multiplexed lights from the port M. The individual wavelength ports #1~#n of the AWG 88 are connected to the optical receiving apparatuses 82-1~82-n through the optical fiber lines 90-1~90-n respectively.

Reflecting elements 92-i-1~4, which have a reflectivity of 0.1~10% for reflecting a wavelength being assigned to the individual wavelength port(divided light port) #i of the AWG 88, and belonging to an FSR different from the FSR to which the wavelengths $\lambda 1 \sim \lambda n$ of the signal light belong, are arranged at marked locations such as connecting positions of optical fibers on each optical fiber line 90-i(i=1~n). In this embodiment, the reflecting elements 92-i-1~4 are further set to reflect wavelengths belonging to the other FSRs.

To give an actual example, as shown in FIG. 3, the reflecting element 92-1~1 of the optical fiber line 90-1 reflects the wavelength $\lambda 11L$, the reflecting element 92-1-2 reflects the wavelength $\lambda 12L$, the reflecting element 92-1-3 reflects the wavelength $\lambda 11S$ and the reflecting element 92-1-4 reflects the wavelength $\lambda 12S$. The reflecting element 92-2-1 of the optical fiber line 90-2 reflects the wavelength $\lambda 21L$, the reflecting element 92-2-2 reflects the wavelength $\lambda 22L$, the reflecting element 92-2-3 reflects the wavelength $\lambda 21S$ and the reflecting element 92-2-4 reflects the wavelength $\lambda 22S$. The reflecting element 92-n-1 of the optical fiber line 90-n reflects the wavelength $\lambda n1L$, the reflecting element 92-n-2 reflects the wavelength $\lambda n2L$, the reflecting element 92-n-3 reflects the wavelength $\lambda n1S$ and the reflecting element 92-n-4 reflects the wavelength $\lambda n2S$.

It is preferable that at least the adjacent reflecting elements have different reflection wavelengths. However, every reflecting element 92-1-1~4 on the optical fiber line 90-1 does not necessarily belong to different FSRs. The same thing can be said about the optical fiber lines 90-2~90-n.

If the reflection wavelengths of the adjacent reflecting elements are different, a fault location between the adjacent reflecting elements, even if the distance between the adjacent reflecting elements is within the distance resolution of the optical pulse tester 84, can be detected with even extreme precision by referring to a reflected pulse location of a reflecting element, having a different reflection wavelength on the same optical line.

Described below is an operation of an embodiment shown in FIG. 4. An optical transmitting apparatus 80 outputs a signal light, obtained by wavelength-division-multiplexing a signal light of the wavelength $\lambda 1$ directed to an optical receiving apparatus 82-1, a signal light of the wavelength $\lambda 2$ directed to an optical receiving apparatus 82-2, . . . , and a signal light of the wavelength $\lambda n$ directed to an optical receiving apparatus 82-n. The wavelength-division-multiplexed signal light from the optical transmitting apparatus 80 is introduced into a port M of an AWG 88 through an optical combiner/divider 86, is wavelength-demultiplexed here into each of wavelength components of $\lambda 1 \sim \lambda n$, and output from individual wavelength ports (divided light ports) #1~#n. As a result, a signal light of the wavelength $\lambda 1$ is introduced into an optical fiber line 90-1, a signal light of the wavelength $\lambda 2$ is introduced into an optical fiber line 90-2, and a signal light of the wavelength $\lambda n$ is introduced into an optical fiber line 90-n. The respective signal lights of the wavelengths $\lambda 1 \sim \lambda n$ are transmitted on the corresponding optical fiber lines 90-1~90-n, and reach the individual optical receiving apparatuses 82-1~82-n to be processed.

When monitoring or measuring a condition of the optical fiber lines 90-1~90-n is desired, a probe pulse light, which has a wavelength coinciding with a reflection wavelength of the reflecting elements 92-i-1~4(i=1~n) on the optical fiber line 90-i, being a monitoring object, is output from the optical pulse tester 84. For instance, to monitor or measure a condition of the optical fiber line 90-1, the optical pulse tester 84 outputs probe pulse lights of wavelengths $\lambda 11L$, $\lambda 12L$, $\lambda 11S$ and $\lambda 12S$ at certain time intervals. If the optical pulse tester 84 can analyze reflected lights of a plurality of different wavelengths, the probe pulse lights, having these plural wavelengths, can be output spontaneously.

The probe pulse lights from the optical pulse tester 84 are introduced into the port M of the AWG 88 through the optical adder/divider 86. If a wavelength of a light introduced into the port M is any one of the wavelengths $\lambda 12S$, $\lambda 11S$, $\lambda 1$, $\lambda 11L$ and $\lambda 12L$, the AWG 88 outputs the input light from a individual wavelength port(divided light port) #1, according to its wavelength division multiplexing/demultiplexing characteristics. Hence, the probe light, from the optical pulse tester 84, is introduced into only the optical fiber line 90-1. The probe light is propagated on the optical fiber line 90-1, being reflected by any one of reflecting elements 92-1-1, 92-1-2, 92-1-3 or 92-1-4, its reflection wavelength being coincident with a wavelength of the probe light.

The probe pulse light of the wavelength $\lambda 11L$, for instance, is reflected by the reflecting element 92-1-1 and Rayleigh backscattered in the other parts. The probe pulse light of the wavelength $\lambda 12L$ is reflected by the reflecting element 92-1-2 and Rayleigh backscattered in the other parts. The probe pulse light of the wavelength $\lambda 11S$ is reflected by the reflecting element 92-1-3 and Rayleigh backscattered in the other parts. The probe pulse light of the wavelength $\lambda 12S$ is reflected by the reflecting element 92-1-4 and Rayleigh backscattered in the other parts.

AWG 88 wavelength-division-multiplexes lights introduced into the individual wavelength ports(divided light ports) #1~#n from the optical fiber lines 90-1~90-n and outputs the multiplexed light from the port M toward the optical combiner/divider 86. When the optical pulse tester 84 outputs probe light of any of these wavelengths $\lambda 12S$, $\lambda 11S$, $\lambda 11L$ and $\lambda 12L$, lights from the optical fiber lines 90-1~90-n are mostly reflected lights of the probe light from the optical fiber line 90-1. The AWG 88 outputs the reflected lights from port M, which entered the individual wavelength port(divided light port) #1 from the optical fiber line 90-1, and the lights enters the optical pulse tester 84 through the optical combiner/divider 86. The optical pulse tester 84 analyzes the intensity of the incident light in a time domain (including to display on a monitor and/or printout).

As described above, in the embodiment, only the Rayleigh backscattered light and the reflected light generated on the optical fiber line 90-1 enter the optical pulse tester 84 for the probe pulse lights of the wavelengths λ12S, λ11S, λ11L and λ12L. As a result, characteristics of the optical fiber line 90-1 can be measured distinctively from those of the other optical fiber lines 90-2~90-n.

By measuring the same optical fiber line with the different wavelengths, location of each of the reflecting elements can be measured individually. Therefore, if there is a fault at a location so near to a reflecting element as within the distance resolution of the optical pulse tester 84, the fault location can be measured referring to the locations of the other reflecting elements. That is, in the embodiment, a fault location near a reflecting element within the distance resolution of the optical pulse tester 84, can be detected with high precision.

When measuring the optical fiber line 90-2, the optical pulse tester 84 may be set to generate probe pulse lights of the wavelengths λ21L, λ22L, λ21S and λ22S. Accordingly, the condition of the optical fiber line 90-2 can be measured distinctively from those of the other optical fiber lines 90-1, 90-3~90-n.

In the embodiment, as the wavelength of the probe light for monitoring a condition of each optical fiber line 90-1~90-n is different from the wavelength of the signal light, monitoring or measuring in an in-service condition becomes possible. Furthermore, the condition of each of the optical fiber lines 90-1~90-n can be monitored or measured individually, namely, separating from the other optical fiber lines 90-1~90-n. A fault location of a break or a crack can be determined precisely since it can be measured with high accuracy based on the reflected pulses from the reflecting elements 92-1-1~4, 92-2-1~4, . . . , 92-n-1~4 whose locations are known beforehand. By locating reflecting elements having reflection wavelengths belonging to the different FSRs of the AWG 88 on the same optical fiber line, even if a fault occurs at a location near to any of reflecting elements, the fault location can be detected correctly and precisely.

In the embodiment shown in FIG. 4, if the optical pulse tester 84 can analyze each of the returned lights by demultiplexing them into respective wavelengths, probe lights of a plurality of wavelengths can be output spontaneously.

The bandwidths of the reflecting elements 92-1-1~4, 92-2-1~4, . . . , 92-n-1~4, may theoretically include the bandwidth of each of the individual wavelength ports (divided light ports) #1~#n of the AWG 88, and it is possible to increase the reflection bandwidth of the reflecting elements 92-1-1~4, 92-2-1~4, . . . , 92-n-1~4. For instance, a reflection bandwidth of the reflecting element 92-1-1 for reflecting the wavelength λ11L may be designed to be the whole FSR portion including the wavelength λ11L as most in FIG. 3. The reason is that the wavelengths λ21L, . . . , λn1L belonged to the same FSR cannot be output from the individual wavelength port(divided light port) #1 of the AWG 88.

It is even possible to expand the bandwidth until the next FSR. Taking the reflecting element 92-1-2 having the wavelength λ12L as the center wavelength into consideration, for example, the wider reflection bandwidth can be designed under the condition that a wavelength output from the port #1 of the AWG 88 is not included. For an example, it is possible to make λn1L~λ22L or λ21L~λn2L in FIG. 3 as the reflection bandwidth.

As described above, by increasing the bandwidth, the requirement for the wavelength stability of an output light of the optical pulse tester 84 can be alleviated. By using the wider reflection bandwidth, the required performance such as tolerance etc. of the center wavelength of a reflecting element can be alleviated and kinds of the reflecting elements used for a system can be decreased. Therefore, the cost of the reflecting elements can greatly be reduced.

Figure 5:
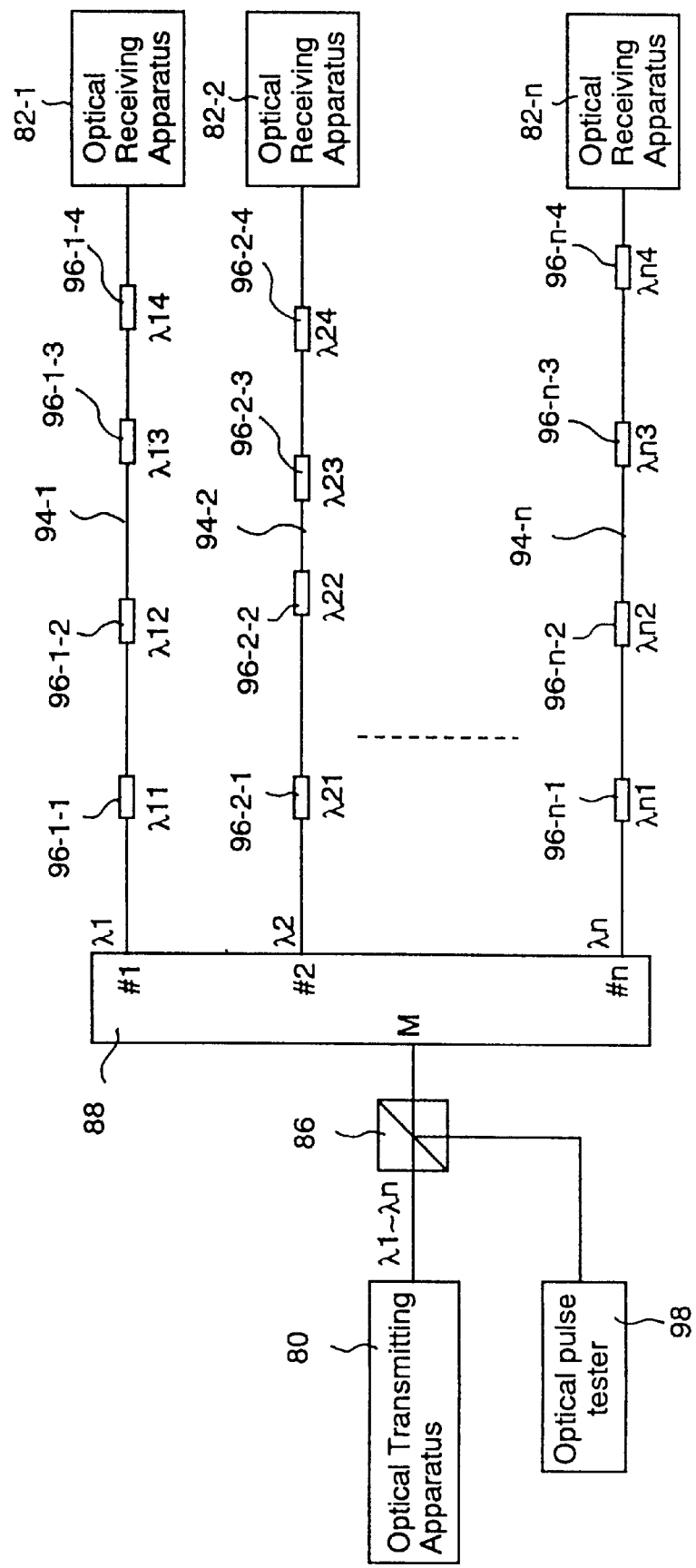
FIG. 5 is a schematic block diagram showing a fourth embodiment of the invention.

FIG. 5 shows a schematic block diagram of a forth embodiment of the invention. In FIG. 5, the common components with FIG. 4 have the same marks.

Figure 6:
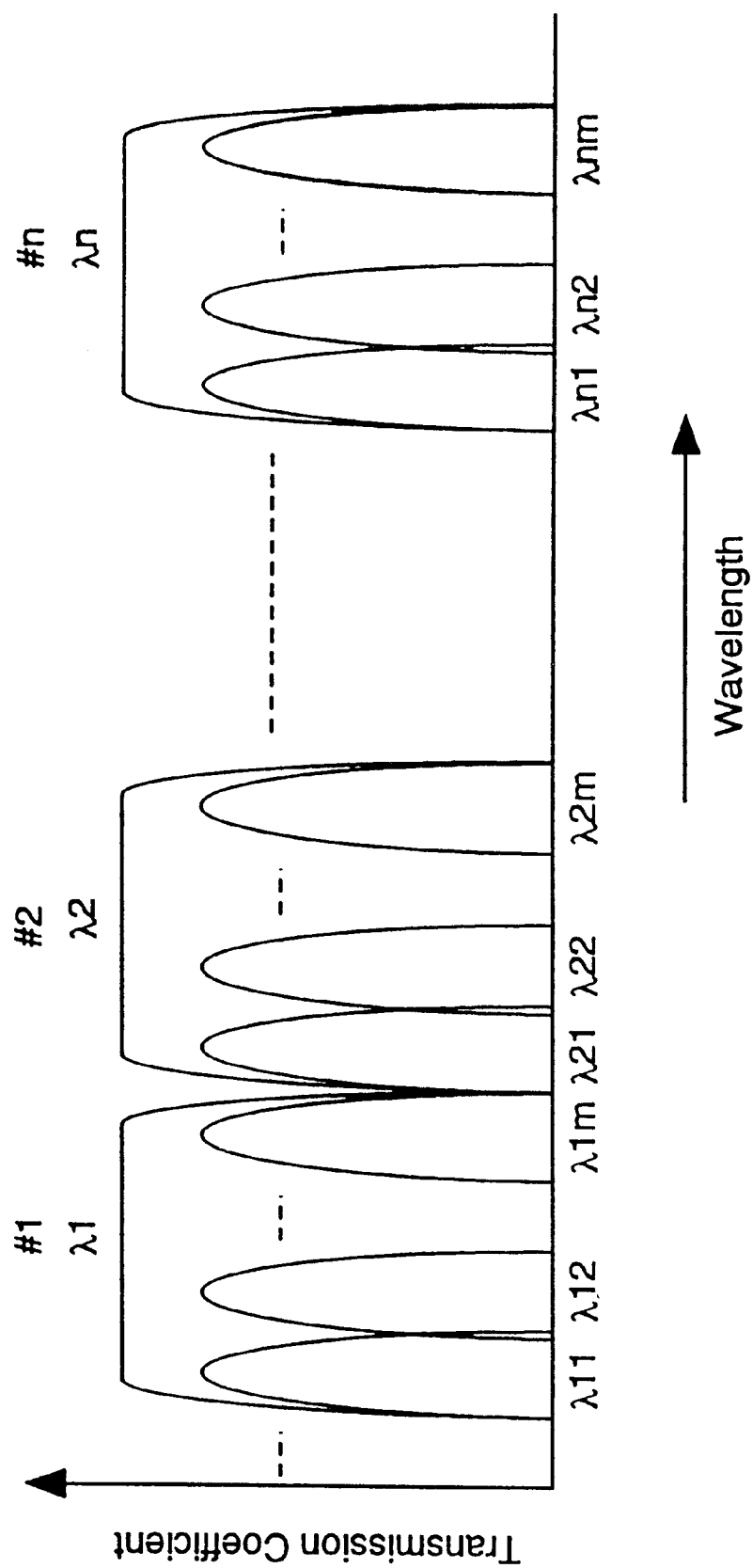
FIG. 6 shows the correspondence between the transmission characteristics of AWG 88 and the reflection wavelengths of elements 96-1-1~4, 96-2-1~4, . . . , 96-n-1~4.

In the embodiment shown in FIG. 4, the reflecting elements 92-1-1~4, 92-2-1~4, . . . , 92-n-1~4, which reflect the wavelengths belonging to a FSR different from the FSR to which the wavelengths λ1~λn of the signal light of the AWG 8 belong, are provided on each of the optical fiber lines 90-1~90-n. However, in the embodiment of FIG. 5, as shown in FIG. 6, the bands of the wavelengths λ1~λn of each of individual wavelength optical ports(divided light ports) #1~#n are further subdivided and reflecting elements 96-1-1~4, 96-2-1~4, . . . , 96-n-1~4 for reflecting the subdivided wavelengths are provided on optical fiber lines 94-1~94-n connecting each of individual wavelength optical ports(divided light ports) #1~#n of the AWG 88 and optical receiving apparatus 82-1~82-n. In FIG. 6, the horizontal axis and the vertical axis show wavelengths and the transmission coefficient of AWG 88 respectively.

To give an actual example of FIG. 6, the reflecting element 96-1-1 reflects the wavelength λ11, the reflecting element 96-1-2 reflects the wavelength λ12, the reflecting element 96-1-3 reflects the wavelength λ13 and the reflecting element 96-1-4 reflects the wavelength λ14 on the optical fiber line 94-1. The reflecting element 96-2-1 reflects the wavelength λ21, the reflecting element 96-2-2 reflects the wavelength λ22, the reflecting element 96-2-3 reflects the wavelength λ23 and the reflecting element 96-2-4 reflects the wavelength λ24 on the optical fiber line 94-2. The reflecting element 96-n-1 reflects the wavelength λn1, the reflecting element 96-n-2 reflects the wavelength λn2, the reflecting element 96-n-3 reflects the wavelength λn3 and the reflecting element 96-n-4 reflects the wavelength λn4 on the optical fiber line 94-n.

As similar to the case in FIG. 4, it is not necessary that the reflection wavelengths of all the reflecting elements 96-1-1~4 on the optical fiber line 94-1 differ each other. A fault location occurred near to a reflecting element can be detected correctly and precisely, if, at least, reflection wavelengths of the adjacent reflecting elements are different. The same can be said with the other optical fiber lines 94-2~94-n.

The optical fiber line 94-1 is described below as an example. The bandwidth of the wavelength λ1 of individual wavelength port #1 of the AWG 88 is subdivided into m wavelength bands of the wavelength λ11~λ1m, as shown in FIG. 6, and the reflecting element 96-1-1 for reflecting λ11, the reflecting element 96-1-2 for reflecting λ12, the reflecting element 96-1-3 for reflecting λ13 and the reflecting element 96-1-4 for reflecting λ14 are provided on the optical fiber line 94-1. The same can be said for the other optical fiber lines 94-2~94-n. In the embodiment shown in FIG. 5, m can be any number as long as it is more than 3. It is not necessary that every reflection wavelength of each of the reflecting elements 96-1-1~4 differ each other. When, at least, reflection wavelengths of adjacent reflecting elements are different, a fault occurred near to any one of the reflecting elements 96-1-1~4, can be detected correctly and precisely, using reflected pulses from the other reflecting elements 96-1-1~4 as a position marker.

An optical tester 98 can freely generate probe pulse lights, which wavelength coincides with the reflection wavelengths of these reflecting elements 96-1-1~4, 96-2-1~4, . . . , 96-n-1~4, using a tunable wavelength light source.

In an conventional AWG, the bandwidths of each of the individual wavelength ports(divided light ports) #1~#n range approximately from a hundred GHz to several hundred GHz. The bandwidths of the reflecting elements 96-1-1~4, 96-2-1~4, 96-3-1~4 and 96-4-1~4 are in an order of from ten GHz to several ten GHZ, and it is obviously possible to realize the above mentioned arrangement.

In the embodiment shown in FIG. 5, in-service monitoring cannot be operated because the wavelength bandwidth of the signal light includes the wavelength of the probe light.

As readily understandable from the above explanation, according to the invention, condition of each of optical transmission lines can be monitored or measured individually. Moreover, even if a fault occurs at a location nearer to a reflecting element arranged on each of optical transmission lines than the distance resolution of an optical pulse tester, the fault location can be detected correctly and precisely using reflected pulses from the other reflecting elements as a position marker.

Furthermore, condition of each of optical transmission lines can be monitored in an in-service condition using a probe light having a wavelength different from a wavelength of a signal light.

What is claimed is:

1. An optical transmission system, comprising:

a plurality of optical transmission lines;

a wavelength dependent optical divider having wavelength periodicity for demultiplexing a wavelength-division multiplexed light from an optical transmitting apparatus into a plurality of different signal wavelengths each being output onto a different one of the optical transmission lines;

a plurality of optical receiving apparatuses each being connected to a different one of the optical transmission lines;

a plurality of reflecting elements each being arranged on a different one of said optical transmission lines, each of the reflecting elements having a reflection bandwidth which does not include the signal wavelength output to its respective optical transmission line and includes at least one wavelength which can be output from the wavelength dependent optical divider to its respective optical transmission line;

an optical pulse tester for outputting probe pulse light having at least one predetermined wavelength, and analyzing reflected light of said probe pulse light in a time domain; and an optical coupler for adding said probe pulse light from said optical pulse tester and said signal light from said optical transmitting apparatus, coupling such combined light to said wavelength dependent optical divider, and coupling the reflected light of said probe pulse light from said wavelength dependent optical divider to said optical pulse tester.

2. The optical transmission system of claim 1 further comprising a second plurality of reflecting elements each being arranged on a different one of the transmission lines and wherein at least one portion of the reflection bandwidths of the first and second reflecting elements on the same optical transmission lines do not overlap each other.

3. The optical transmission system of claim 1 wherein said wavelength dependent optical divider comprises an arrayed waveguide grating type divider.

* * * * *